US010657443B2

(12) United States Patent
Araujo et al.

(10) Patent No.: US 10,657,443 B2
(45) Date of Patent: May 19, 2020

(54) DETECTION OF HAZARDOUS LEAKS FROM PIPELINES USING OPTICAL IMAGING AND NEURAL NETWORK

(71) Applicant: Southwest Research Institute, San Antonio, TX (US)

(72) Inventors: Maria S. Araujo, San Antonio, TX (US); Samantha G. Blaisdell, San Antonio, TX (US); Daniel S. Davila, San Antonio, TX (US); Edmond M. DuPont, San Antonio, TX (US); Sue A. Baldor, San Antonio, TX (US); Shane P. Siebenaler, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 252 days.

(21) Appl. No.: 15/986,868

(22) Filed: May 23, 2018

(65) Prior Publication Data
US 2018/0341859 A1 Nov. 29, 2018

Related U.S. Application Data

(60) Provisional application No. 62/510,318, filed on May 24, 2017.

(51) Int. Cl.
*G06N 3/08* (2006.01)
*G06N 3/04* (2006.01)
(Continued)

(52) U.S. Cl.
CPC ............. *G06N 3/08* (2013.01); *F17D 5/06* (2013.01); *G06K 9/00637* (2013.01); *G06K 9/4628* (2013.01); *G06K 9/6267* (2013.01); *G06K 9/6274* (2013.01); *G06K 9/6289* (2013.01); *G06N 3/0454* (2013.01); *G06N 3/0481* (2013.01); *G06N 5/046* (2013.01); *G06N 20/00* (2019.01); *G06T 5/50* (2013.01);
(Continued)

(58) Field of Classification Search
None
See application file for complete search history.

(56) References Cited

U.S. PATENT DOCUMENTS

| 2002/0119513 | A1* | 8/2002 | Alocilja | ............... G01N 21/27 435/34 |
| 2003/0195708 | A1* | 10/2003 | Brown | ............... G01N 33/2823 702/22 |
| 2016/0195856 | A1* | 7/2016 | Spero | ............... G06N 5/046 700/90 |

OTHER PUBLICATIONS

"Song, Dongmei et al, Ocean Oil Spill Classification with RADARSAT-2 SAR Based on an Optimized Wavelet Neural Network, Jun. 20, 2017" (Year: 2017).*

(Continued)

*Primary Examiner* — Kevin Ky
(74) *Attorney, Agent, or Firm* — Livingston Law Firm

(57) ABSTRACT

A method of training a learning machine to detect spills of hydrocarbon liquids from pipelines. A neural network is trained by collecting samples of a number of different ground materials as well as a number of liquid hydrocarbons. For each hydrocarbon, a spill is simulated on each ground material. For each of these spills, a thermal camera and a visible light camera are used to capture images. The images from the two cameras are fused, and input to the neural network for classification training. Once the neural network is trained, a system having the two cameras and the neural network can be used to detect actual hydrocarbon spills.

5 Claims, 4 Drawing Sheets

(51) Int. Cl.
*F17D 5/06* (2006.01)
*G06N 5/04* (2006.01)
*G06K 9/62* (2006.01)
*G06T 5/50* (2006.01)
*G06N 20/00* (2019.01)
*G06T 7/00* (2017.01)
*G06K 9/00* (2006.01)
*G06K 9/46* (2006.01)

(52) U.S. Cl.
CPC .. *G06T 7/0004* (2013.01); *G06K 2009/00644* (2013.01); *G06T 2207/10024* (2013.01); *G06T 2207/10032* (2013.01); *G06T 2207/10048* (2013.01); *G06T 2207/20084* (2013.01); *G06T 2207/20221* (2013.01)

(56) References Cited

OTHER PUBLICATIONS

"Gomez-Carracedo, M.P. et al, Screening oil spills by mid-IR spectroscopy and supervised pattern recognition techniques, Mar. 29, 2012" (Year: 2012).*

"Singha, Suman et al, Satellite Oil Spill Detection Using Artificial Neural Networks, Dec. 2013, IEEE Journal of Selected Topics in Applied Earth Observations and Remote Sensing, vol. 6, No. 6" (Year: 2013).*

* cited by examiner

DETECTION OF HAZARDOUS LEAKS FROM PIPELINES USING OPTICAL IMAGING AND NEURAL NETWORK

PRIORITY TO PRIOR FILING

This application claims benefit of U.S. App. No. 62/510,318, a provisional filing, filed May 24, 2017.

TECHNICAL FIELD OF THE INVENTION

This invention relates to detection of hazardous leaks from pipelines, and more particularly to detecting such leaks with optical imaging data processed by a neural network.

BACKGROUND OF THE INVENTION

Leaks in pipelines carrying hazardous liquids are a growing problem. An expansion of leak events, combined with an increasing amount of pipeline infrastructure near urban centers and environmentally sensitive areas, has renewed the focus on the detection of leaks in hazardous liquid pipelines Most of today's pipeline leak detection systems are unable to detect small leaks, for example, leaks less than 1% of the pipeline throughput. Furthermore, detection systems aimed at detecting small leaks have high rates of false alarms. High false alarm rates result in leak detection systems that are ultimately ineffective because the alarms are ignored.

Hazardous liquid leak detection systems for continuous monitoring can be categorized into internal leak detection systems and external leak detection systems.

Internal leak detection systems use measurement sensors providing flow or pressure readings, and perform calculations to estimate the state of the fluids within the pipe. Examples of internal leak detection systems are volume balance, rate of pressure/flow change, pressure point analysis, negative pressure waves, mass balance, real-time transient modeling.

External leak detection systems use dedicated instrumentation equipment, located externally to the pipe, to detect escaped fluids. Examples of common external leak detection systems are those using acoustic sensors, fiber optic cables, temperature sensing cables, liquid or vapor sensing cables, and imaging systems.

A conventional approach to using an imaging system for leak detection is to use infrared or thermal imaging. Certain hydrocarbons absorb infrared radiation, which makes it possible to detect leaks with infrared cameras. The thermal conductivity in wet (leak-saturated) ground is different than in dry ground, which also allows thermal imaging to detect leaks.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a pipeline leak detection system that uses a thermal camera and a visible camera to acquire image data of the surface near a pipeline. The image data is input to a convolutional neural network classifier, which has been trained to identify signatures of hazardous liquids typically found in oil pipelines. These hazardous liquids include crude oil, mineral oil, gasoline, and diesel, which cover a large percentage of the hazardous liquids in pipelines in the United States. The classifier is further trained to identify signatures of a variety of non-leak events that could be confused with hazardous liquid leaks, in order to substantially reduce false positive rates.

Figure 1:
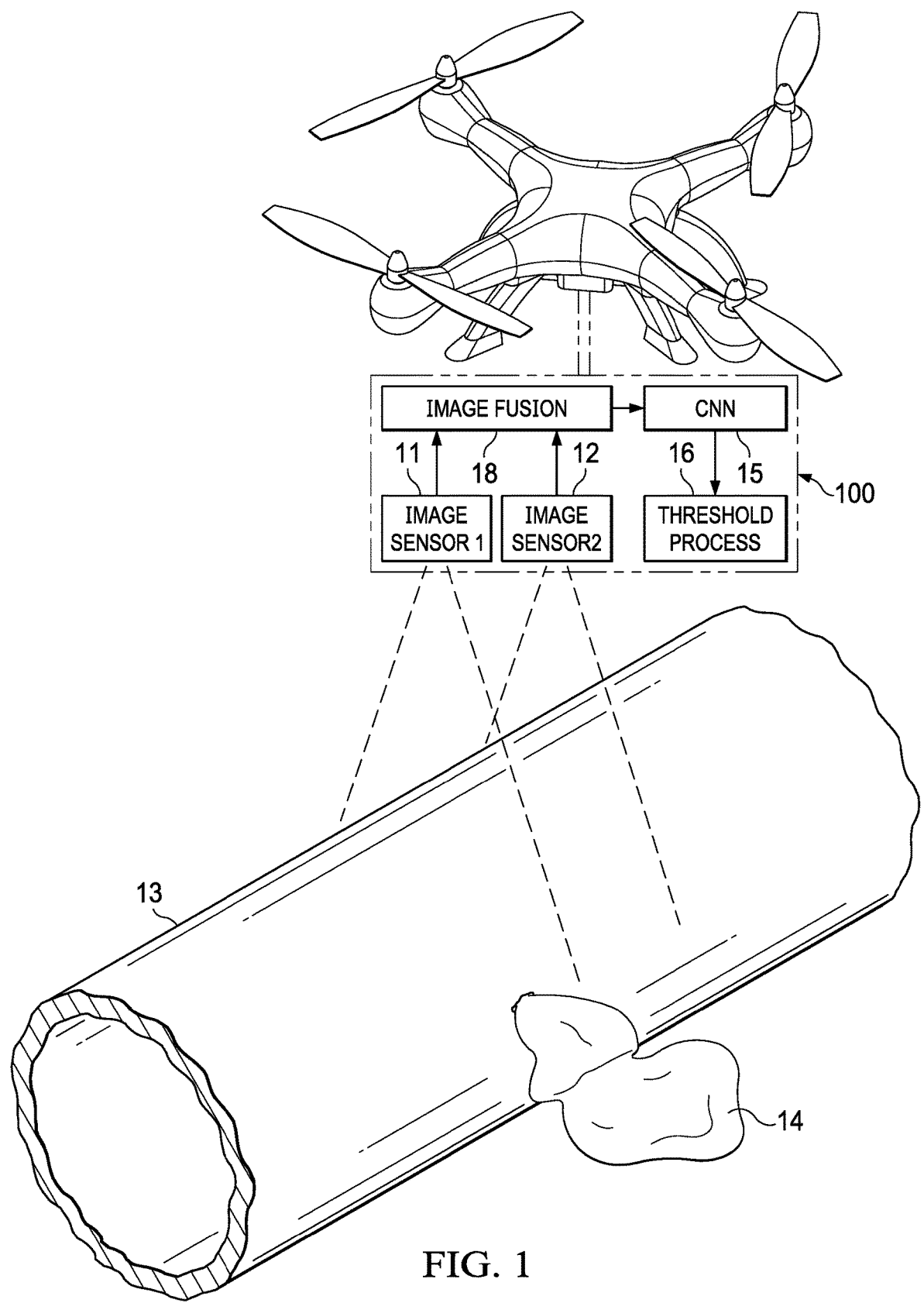
FIG. 1 illustrates a pipeline leak detection system in accordance with the invention.

FIG. 1 illustrates an overview of a pipeline leak detection system in accordance with the invention. Two image sensors 11 and 12 are located above a pipeline 13 to acquire images of the ground above and near the pipeline 13. The pipeline has a leak 14, which has spilled a hydrocarbon fluid onto the ground or other surface near the pipeline 13.

The platform for carrying the sensors 11 and 12 can be airborne, such as a drone or other unammaned aircraft, but may be any type of moving vehicle, manned or unmanned. The platform may also be stationary. An expected application of system 100 is placement at pumping stations along pipeline routes. The image sensors 11 and 12 can be either staring or panning.

Image sensors 11 and 12 are two different types of sensors. A feature of the invention is that image sensors 11 and 12 are a combination of a visual and a thermal image sensor, one of each type. An example of a suitable visual image sensor is a conventional CCD camera, or other RGB camera, such as those that detect the visible spectrum, e.g., 0.4 to 0.9 micrometer wavelengths. An example of a suitable thermal image sensor is a thermal infrared sensor in the 7.5-13 micrometer wavelength range. However, other types of image sensors, such as hyperspectral and infrared may be used in addition to or instead of visual and thermal sensors.

The image data from both sensors 11 and 12 is delivered to an image data fusion process 18. To correlate the images from the sensors 11 and 12, an image registration process matches salient features between a selected target sensor's image and all other sensor images. The registration process maps the images of sensors 11 and 12 to a single image to effectively provide an extended hyperspectral or multispectral data as an input to the convolutional neural network (CNN) 15. For purposes of training CNN 15, registration of the images provides the ability to analyze the sensor systems independently and collectively to determine the best combination of sensors to classify a particular leaking hazardous liquid.

The fusion image data is provided to a convolutional neural network (CNN) 15 for the purpose of identifying a leak of hazardous liquids 14 from the pipeline 13. The leak 14 of hazardous liquid can be a past event, and need not be actively progressing.

CNN 15 implements "deep learning", which is a machine learning technique that covers a large number of related methods. The "deep" in deep learning refers to the depth of layers that make up the neural network. In recent years, a number of mathematical discoveries combined with rapid improvements in multi-core processing hardware have brought the potential of deep learning techniques into the mainstream. A primary deep learning technique is called Convolutional Neural Network (CNN) learning. In this technique, the two-dimensional structure of image data is exploited by constructing a feature space based on numerous small patches that are convolved with the input image at different scales. When combined with several standard fully connected layers, this technique provides a flexible and powerful way of meeting computer vision challenges such as detection, classification, tracking, etc. Visual features are effectively learned by optimizing the connections between nodes in each convolutional layer, making them robust and accurate as compared to hand-constructed features. CNN 15 is a deep convolutional neural network applied to the image data to detect hazardous liquids.

CNN 15 can be implemented with known processing hardware systems, programmed to perform the tasks described herein.

Figure 2:
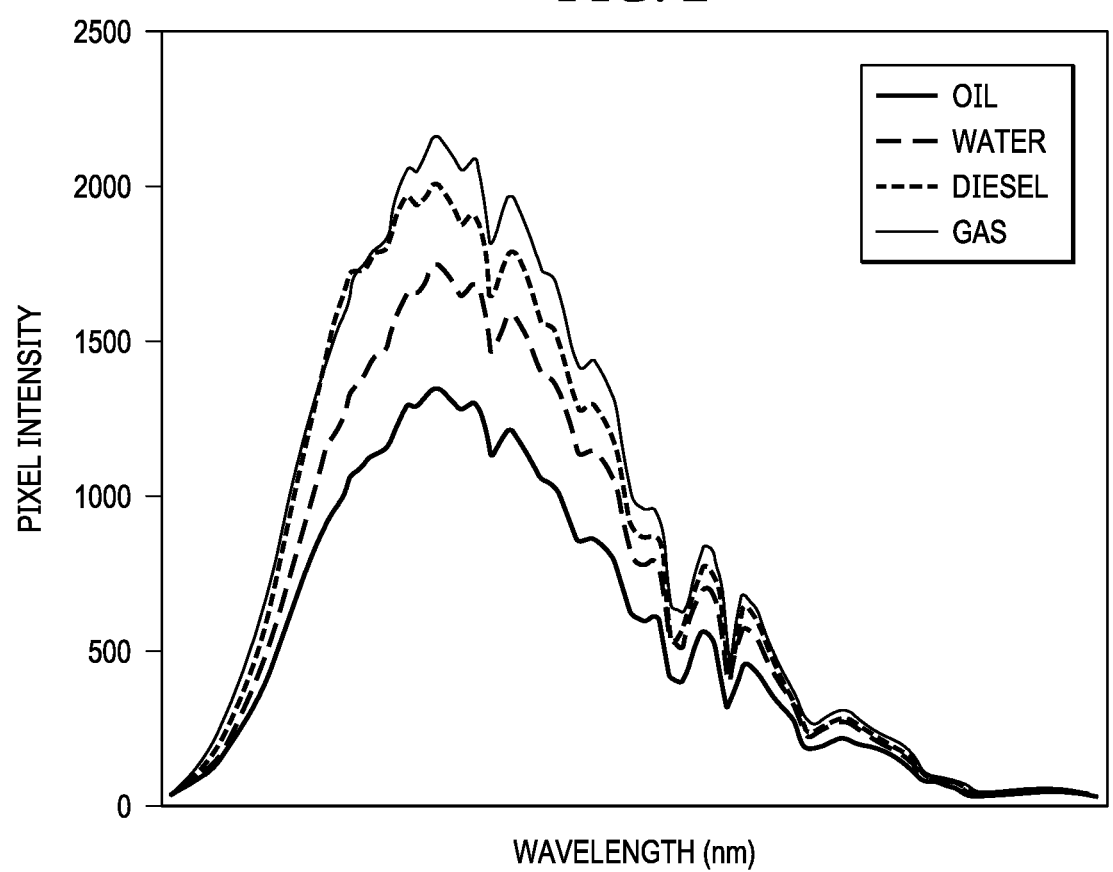
FIG. 2 illustrates mean spectral vectors for images of leaks of various hazardous liquids.

FIG. 2 illustrates typical mean spectral vectors for images of leaks of various hazardous liquids. In this example, the images were of a leak on a gravel surface. As illustrated, the spectral composition collected for each liquid shows little difference between each. The similarities in the characteristic shapes of each curve are believed to be the spectrum of sunlight itself reflecting from the liquid surfaces. This is supported by the fact that the same shape is observed from other highly reflective surfaces, such as white metals and concrete.

Figure 3:
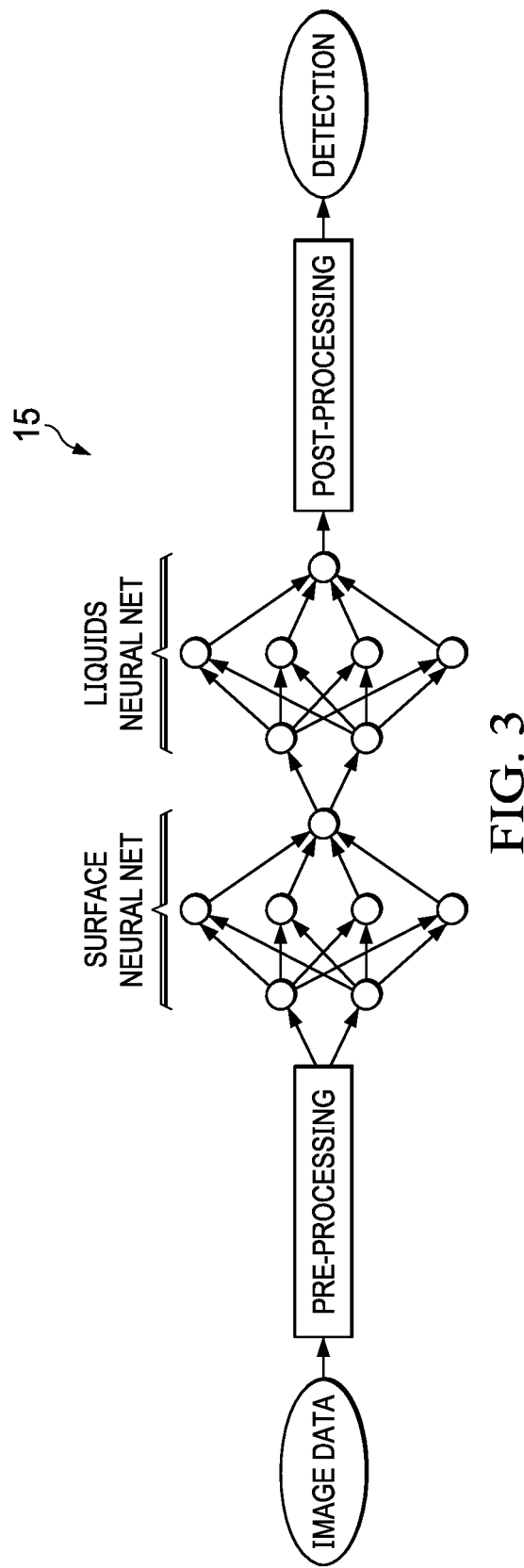
FIG. 3 illustrates the convolutional neural network of FIG. 1.

FIG. 3 illustrates the convolutional neural network (CNN) 15 of FIG. 1. CNNs operate on a different principle than classical statistical classifiers—features need not be hand-crafted in a CNN application. Instead, the CNN algorithm self-learns parameters at each network layer, which minimizes classification loss function over a series of training iterations.

In one embodiment, CNN has a tiered architecture, in which the tasks of classifying surfaces and determining the presence of hazardous liquids are divided between two networks. This is in contrast to using a single neural network to handle classification of composite classes that consist of combinations of surfaces and hazardous liquids. Because of the nuances in distinguishing between the visual and thermal effect of each hazardous liquid to each of the underlying surface textures, it can be taxing on a single classifier to account for both surface type and the anomalistic color or thermal characteristics caused by a present liquid. For example, with a single neural network, the classifier might confuse different surfaces with hazardous liquids on them, such as confusing green grass for grey concrete which had different liquids on them.

In other embodiments, a non-tiered neural network design may be used. However, it is to be understood that the use of various types of learning machines are possible and equivalent, all being implemented with appropriate computing hardware and software. The term "learning machine" is used herein to refer to various types of neural networks and other computing equipment capable of being trained in the manner described herein.

Examples of different surfaces used for training are gravel, grass or other vegetation, dirt, and concrete. Examples of fluids are mineral oil, gasoline, diesel, crude oil, water, and no liquid (surface only). Test surfaces and test liquids can be presented to the sensors 11 and 12 in containers. An example of a suitable container is a shallow 4'×4' containment tub.

For training CNN 15, images with various thermal conditions, lighting, fluid types, and surfaces are used. Examples of lighting scenarios are shaded and non-shaded scenarios, and also dawn, sunny and cloudy conditions. With this training, the leak detection system 100 is not susceptible to changing conditions in the environment of a leak event.

Other parameters for training include distance from the leak and view angles. Both sensors 11 and 12 record data simultaneously to allow for the construction of a composite image using data from all or any subset of the sensors.

In addition to training CNN 15 to classify hazardous liquid leak events, CNN 15 is trained to classify non-leak events. Scenarios that could trigger false alarms (i.e. non-leak events) are simulated and characterized. Focus is given to highly reflective and highly absorbent materials and conditions that are typically found near pipelines. Examples of such conditions are water pools, presence of highly-reflective surfaces (e.g. insulation sheeting on pipes), concentrated zones of heat (e.g. from the sun and other warm fluids).

In addition to the CNN 15, a configurable threshold is added as post-process 16 to only consider pixels with a given certainty to be determined as a hazardous or non-hazardous substance. The optimal threshold may vary across datasets.

Detection system 100 operates autonomously, that is, no human operator is required to view images. If CNN 15 recognizes a signature that matches a known leak of a hazardous material, above the threshold as determined by post-process 16, an output can be presented that indicates the hazardous leak.

Figure 4:
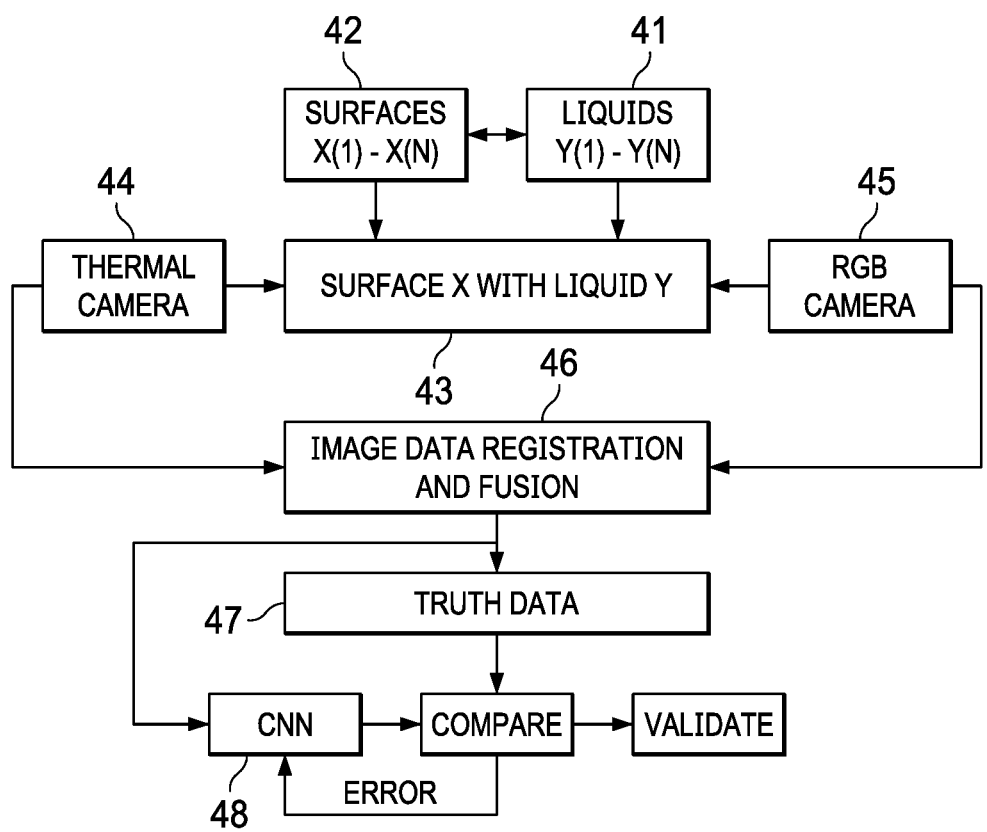
FIG. 4 illustrates a method of training a neural network for detection of liquid leaks from pipelines.

FIG. 4 illustrates a method of training a neural network or other learning machine for detection of liquid leaks from pipelines. As described above, using feature extraction and classifier training methods, the neural network is trained to identify features of hydrocarbon liquids across a range of environmental conditions. A system 100 with a trained neural network detects hydrocarbon liquid leaks as well as "non hydrocarbon" leak events.

In Step 41, a set of hydrocarbon liquids, such as are carried in pipelines, is collected. Examples of such liquids are crude oil, diesel fuel, gasoline, and mineral oil, water and others set out above.

In Step 42, a set of surface materials is collected. Examples of surface materials are grass, gravel, soil, sand, hard surfaces such as concrete and pavement, and many others. Because these materials are types of materials onto which a spill from a pipeline may leak, they are referred to herein as "ground materials". These materials are placed in containers or otherwise deposited in a manner that spills into or upon them can be simulated and captured by camera.

As indicated in Step 43, for each surface material and each liquid, that surface material with a liquid spill is prepared. A thermal camera 44 and an RGB camera 45 each capture images of the spill on that surface. The cameras 44 and 45 have a field of view that includes the spill and can be on a stationary or mobile platform. The mobile platform can be an aerial or ground vehicle.

In Step 46, the images from cameras 44 and 45 are fused, using an image registration process, as described above.

The result of Step 46 is a set of training data 47. When the images are input to the neural network 48, the neural network 48 is trained by comparing the desired output to the actual output and modifying the neural network to adapt toward the desired output.

It has been found that neural network 48 can be trained to not only identify hydrocarbon liquid leaks, but to differentiate between hydrocarbon liquids. For example, neural network 48 can have five classes of output: mineral oil, crude oil, gasoline, diesel, and "not hydrocarbon".

The above described process is repeated for a number of surface materials and a number of hydrocarbon liquids. After many iterations of training, the neural network 48 will provide the correct identification of a hydrocarbon liquid when presented with an input image of a spill of that liquid.

The invention claimed is:

1. A method of training a learning machine to detect spills of hydrocarbon liquids from pipelines, comprising:
    collecting samples of a number of different ground materials;
    collecting samples of a number of hydrocarbon materials that are or become liquid when spilled from a pipeline;
    for each hydrocarbon material, simulating a spill on each ground material, thereby providing a collection of spill samples;
    for each spill sample, performing the following steps: using a thermal camera to capture a thermal image of the spill sample; using a visible wavelength camera to capture a red, blue, green (RGB) image of the spill sample; fusing the thermal image and the RGB image, thereby providing a fused image; inputting the fused image to a neural network, comparing the output of the neural network to at least one hydrocarbon classification represented by the fused image, and adjusting the neural network to provide output data that more closely matches the hydrocarbon identifier.

2. The method of claim 1, wherein the learning machine is a convolutional neural network.

3. The method of claim 1, wherein the hydrocarbon classification is one or more of the following: mineral oil, diesel, gasoline, crude oil.

4. The method of claim 1, wherein the output of the neural network is further compared to a non-hydrocarbon classification.

5. The method of claim 1, wherein the learning machine is a tiered neural network, having one tier for classifying surfaces and another tier for classifying liquids.

* * * * *